United States Patent

[11] 3,549,159

[72] Inventor  Donald F. Kroener
              1857 Emerson, Palo Alto, Calif. 94301
[21] Appl. No. 680,490
[22] Filed     Nov. 3, 1967
[45] Patented  Dec. 22, 1970

[54] TOOL MOUNTING UNIT
     1 Claim, 5 Drawing Figs.
[52] U.S. Cl. .................................................. 279/53
[51] Int. Cl. ............................................. B23b 31/20
[50] Field of Search .................................. 279/51, 52,
                                              53, 103; 401/92, 93

[56]             References Cited
             UNITED STATES PATENTS
2,282,574  5/1942   Halbasch ...................... 401/93
2,438,797  3/1948   Bagge ........................... 279/51
2,619,724  12/1952  Manthey et al. ............... 279/53X
             FOREIGN PATENTS
935,770    1948     France .......................... 279/53

OTHER REFERENCES
Lionel S. Marks, Editor in Chief — Mechanical Engineers Handbook, Second Edition, 1928, pages 234 & 235

Primary Examiner—Robert C. Riordon
Assistant Examiner—Donald D. Evenson
Attorney—Townsend and Townsend ABSTRACT: A mounting unit for a tool wherein a barrel is adapted to receive a chuck in one end thereof and a shaft in the opposite end thereof with the shaft being releasably coupled with the chuck to draw the latter into the barrel. The chuck has a tool-receiving slot, the chuck and barrel having mating beveled surfaces which engage each other to reduce the slot width and thereby clamp a tool in the slot when the chuck is drawn into the barrel by the shaft. The components of the unit are constructed to prevent "freezing" or galling at the junctions between the components.

PATENTED DEC 22 1970 3,549,159
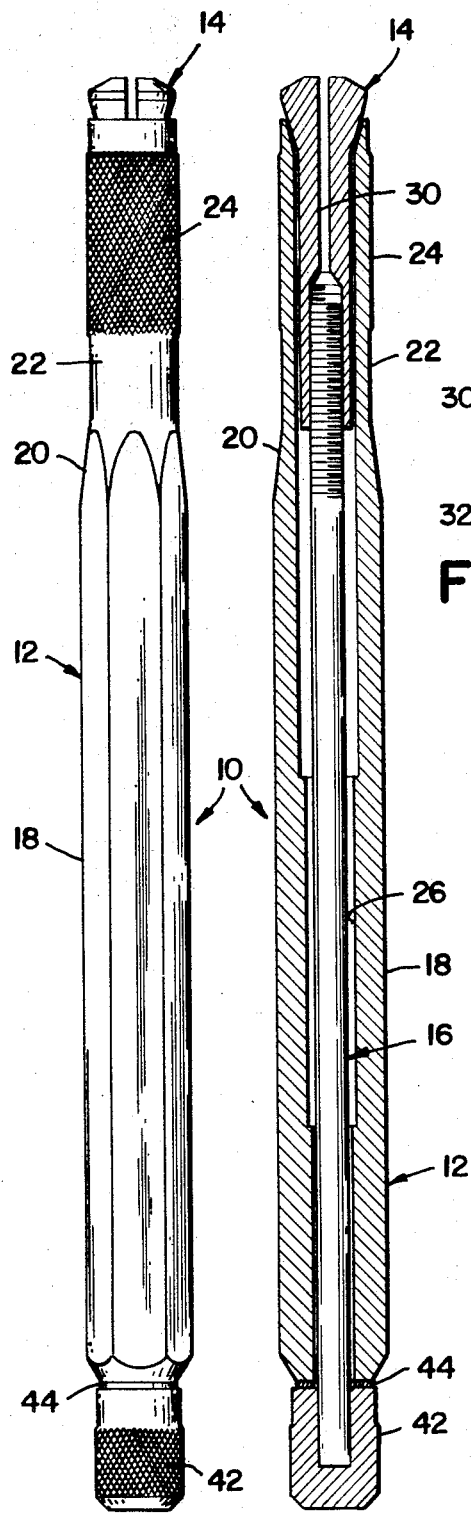
FIG_1  FIG_2
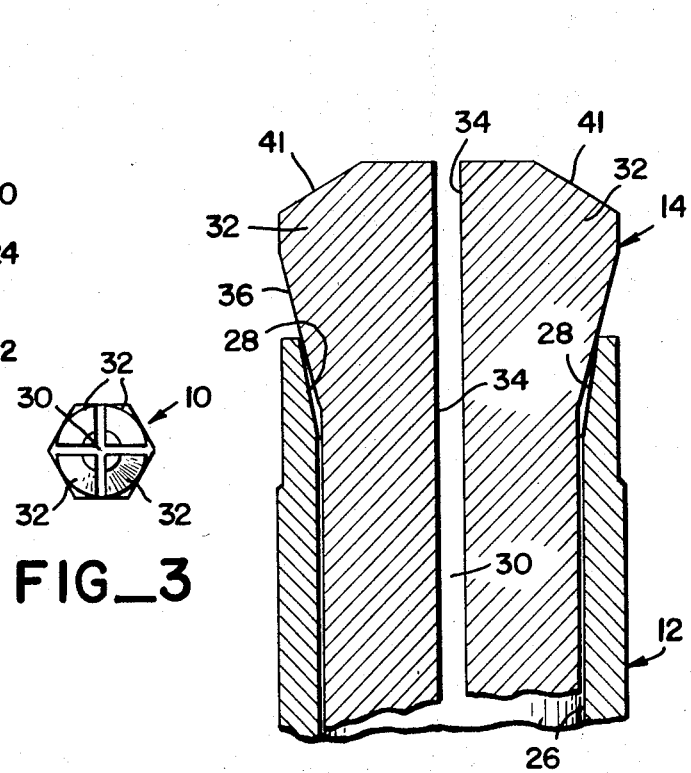
FIG_3
FIG_4
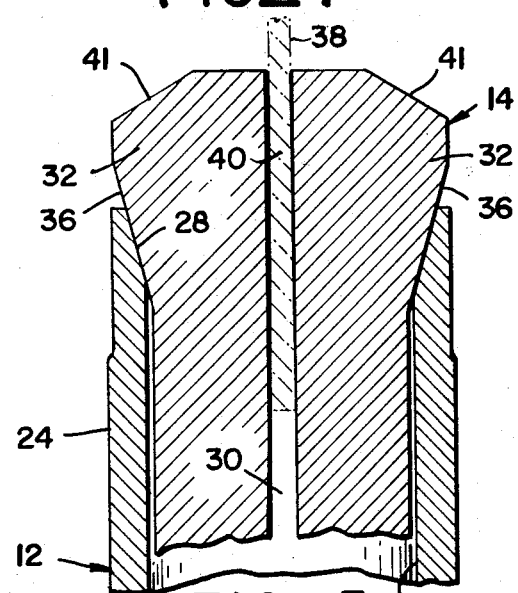
FIG_5
INVENTOR.
DONALD F. KROENER
BY
Townsend and Townsend
ATTORNEYS

TOOL MOUNTING UNIT

This invention relates to improvements in the mounting of hand-held tools and, more particularly, to a tool-mounting unit of the type used in graphic arts work and by hobbyists.

The present invention is directed to a tool-mounting unit comprised of a barrel having opposed, open ends and disposed for receiving a tool-holding chuck or collet in one end thereof. Means in the nature of a shaft is provided to extend into the barrel at its opposite end and to be coupled to the collet in a manner to cause the latter to be drawn into the barrel. The collet has a slot therein for receiving a tool and to present a pair of tool-clamping members on opposite sides of the slot. Thus, when the collet is drawn into the barrel, the outer surfaces of the clamping members engage the barrel to decrease the width of the slot and thereby exert a clamping force on the tool. In this way, the tool is firmly and releasably secured to the barrel to permit the tool to be used while the barrel is held in the hand.

The shaft has a knob secured thereto externally of the opposite end of the barrel so that the shaft can be rotated and thereby effect the clutching and declutching action of the collet remotely of the collet itself.

The shaft is threadably coupled to the end of the collet within the barrel and has a stop engageable with the opposite end of the barrel. Thus, by rotating the shaft in opposite directions, the collet is caused to move into and out of the barrel and, as it moves into the barrel, the clamping members reduce the thickness of the slot and thereby clamp onto a tool disposed in the slot itself.

Since a clamping force is used by the mounting unit to releasably hold a tool in a fixed position relative to the barrel, each of the adjacent components which engage each other, such as the barrel and the collet, the collet and the shaft, and the knob and the barrel, will be subjected to mechanical pressure. Such pressure could be sufficiently large so as to result in "freezing" of the components together and galling of the contacting surfaces of the components unless measures are taken to prevent these conditions from occurring. Both of these conditions are clearly undesirable since they seriously affect the efficiency of the mounting unit itself.

The present invention circumvents the problems associated with the aforesaid conditions by providing a construction by means of which the components of the mounting unit are maintained operable at all times. Firstly, the collet and the proximal end of the barrel are provided with opposed, generally complemental surfaces which are beveled at predetermined angles with each angle being greater than the angle of repose or the critical friction angle of the material forming the component. This angle of repose or critical friction angle is defined as the angle at which mating surfaces of two members forced together must be disposed relative to the direction of the applied force holding the members together to avoid "freezing" or galling of the surfaces. Since the beveled surfaces are at angles above the friction angle relative to the direction of the applied force, i.e., the axis of the barrel, there will be no "freezing" or galling of the collet and barrel to assure that the collet will be immediately separated from the barrel when the shaft is rotated in the proper direction.

The collet and the barrel can be formed from the same material or from dissimilar materials, whichever is desired. If they are formed of dissimilar materials, the bevel of each mating surface will be greater than the larger of the critical friction angles of the two materials.

A second way in which the aforesaid conditions are avoided is to use dissimilar materials with those components which do not form angles relative to the direction of the applied force. Similarly, the knob or stop at the outer end of the shaft engages the proximal end of the barrel parallel to the applied force. By making the collet and the shaft of dissimilar materials, the threaded coupling will not "freeze" or gall. Similarly, by making the knob and the barrel of dissimilar materials, there will be no "freezing" or galling at this location. For purposes of economy, it may be desirable to make the barrel and the knob from the same material, such as aluminum, and to include, as part of the knob, a spacer of another material, such as brass, that will be forced against the barrel by the knob. This construction, therefore, will prevent "freezing" or galling at this location.

Since the shaft is threadably coupled to the collet, the collet can be changed as desired to hold different types of tools. This interchangeability of the mounting unit permits it to be more versatile than if only a single collet were used. Also, the changeover from one collet to another can be made without removing the shaft from the barrel.

A further feature of the invention is the fact that the outer end of the collet is essentially blunt so that the major portion of the collet is disposed within the barrel when a tool is clamped in place in the slot of the collet. Thus, the collet provides a better grip on the tool inasmuch as the effective gripping area of the collet is increased because only a relatively small part of the collet extends outwardly from the barrel itself.

Another feature of the invention resides in the fact that the collet is undercut at the base of the beveled surfaces thereof. This undercut region assures that there will be no "freezing" or galling of the collet to the barrel at the vicinity of the base of the beveled surfaces of the collet.

Another important feature of the invention resides in the use of a thread pitch of at least 32 threads per inch at the threaded coupling between the shaft and the collet. This feature minimizes the effort required to effect a given clamping force on the tool in the slot of the collet since the mechanical advantage of the coupling is at a relatively high value.

It is, therefore, the primary object of this invention to provide an improved tool-mounting unit having a number of components, including a tool-clutching collet whose clutching action is effected at a location remote from the collet itself, with the unit being constructed in a manner to avoid "freezing" or galling of the components to thereby provide a highly efficient device which is simple and rugged and has a relatively long useful life.

Another object of this invention is to provide a tool-mounting unit of the type described wherein the tool-receiving collet and the barrel have beveled mating surfaces whose bevel angle is greater than the friction angle of the materials to thereby assure that there will be no "freezing" or galling of these two components to thereby assure proper clutching and declutching of a tool by the collet at all times.

A further object of this invention is to provide a tool-mounting unit of the aforesaid character wherein at least certain of the components comprising the unit are of dissimilar materials to avoid the "freezing" and galling problem mentioned hereinabove.

Yet another object of this invention is to provide a tool-mounting unit having a tool-clutching action actuated remotely from the area at which the unit is normally hand-held to thereby assure that the clutching action will not be affected by the presence of the fingers holding the unit, whereby the problems associated with tool-mounting units of conventional construction will be avoided.

Other objects of this invention will become apparent as the following specification progresses, reference being had to the accompanying drawing for an illustration of a preferred embodiment of the invention.

In the drawing:

FIG. 1 is a side elevational view of the tool-mounting unit with the collet thereof in a position to receive a tool;

FIG. 2 is a cross-sectional view of the unit;

FIG. 3 is a front elevational view of the unit;

FIG. 4 is an enlarged, fragmentary view of the unit, partly in section, showing the relative positions of the collet and barrel when the unit is ready to receive a tool; and FIG. 5 is a view similar to FIG. 4 but showing the relative positions of the collet and barrel when a tool, such as a blade, is received within the slot of the collet.

The tool-mounting unit of this invention is broadly denoted by the numeral 10 and includes a barrel 12, a collet or chuck 14 received within one end of barrel 12 and a shaft 16 received within the opposite end of the barrel and threadably coupled to the normally innermost end of collet 14. Barrel 12 has a major portion defined by the numeral 18 which is provided with a hexagonal outer configuration, the configuration extending to a location denoted by the numeral 20 which is spaced from the end proximal to collet 14. Between location 20 and the proximal end of the barrel, the latter has a generally cylindrical region 22 provided with a knurled outer surface 24 which is normally engaged by the fingers of the hand when unit 10 is hand-held and is in use. Also, the barrel has an inner bore 26 which has a diameter sufficient to allow shaft 16 to rotate within and axially of the barrel.

Barrel 12 has a beveled, annular surface 28 extending inwardly from the end corresponding to collet 14 (FIGS. 4 and 5). The bevel angle of surface 28 is greater than the friction angle of the material from which the barrel is formed. Preferably, the barrel is formed from aluminum whose critical friction angle or angle of repose is of the order of 9°. For purposes of illustration, the bevel angle of surface 28 is, therefore, about 11°.

Collet 14 has a cruciform slot 30 extending thereinto to a location at least midway between the ends of the collet, as shown in FIGS. 2 and 3. Slot 30 is adapted to receive a suitable tool, such as the shank of a knife blade. Slot 30 defines two pairs of clamping members 32 whose inner clamping surfaces 34 define the respective boundaries of slot 30. Collet 14 is formed from a material which permits some relative movement of members 32 so that the members of each pair can move toward each other and thereby into clamping relationship to a tool disposed within slot 30.

Each clamping member 32 has a beveled outer surface 36 which is adapted to mate with beveled surface 28 of barrel 12. The bevel angle of surface 36 is greater than the friction angle of the material forming collect 14 and is preferably greater by at least several degrees than the bevel angle of surface 28 when clamping members 32 are in their equilibrium positions, i.e., the positions corresponding to the maximum width of the slot. The bevel angle of surfaces 36 are preferably of a value which permit surfaces 28 and 36 to be essentially complemental to each other in the manner shown in FIG. 5 when a tool 38, such as the shank 40 of the blade or the like, is received within slot 30 and when collect 14 is drawn inwardly of barrel 12 by the rotation of shaft 16 in the manner to be described.

The innermost end of collet 14 is internally threaded to threadably receive the normally innermost end of shaft 16. The thread pitch at this junction is at least 32 threads per inch to maintain the mechanical advantage of the threaded coupling at a relatively high value. Thus, a minimum of effort is required to effect movement of collet 14 in either direction with respect to barrel 12. Also, shaft 16 is preferably formed from a material which is different from the material forming collet 14 to thereby prevent "freezing" or galling of these two components when the collet is forcibly held within the barrel. To this end, collet 14 may be formed from aluminum and shaft 16 may be formed from stainless steel.

Shaft 16 is provided with a knurled knob 42 rigidly secured thereto in any suitable manner. A spacer 44 is carried on shaft 16 and is adapted to be disposed between knob 42 and the proximal end of barrel 12. Spacer 44 is used where knob 42 is of the same material as barrel 12. The purpose of the spacer is, therefore, to provide a component of a different material from the barrel so that "freezing" and galling of the barrel and the knob will be prevented when the collet is in an operative position clamping a tool in slot 30. To this end, spacer 44 may be of brass while knob 42 as well as barrel 12 may be formed of aluminum.

As shown in FIGS. 4 and 5, the cylindrical part of collet 14 is undercut relative to the inner surface of barrel 12. This feature assures that there will be no "freezing" or galling of this part of the collet with the barrel.

As shown in FIGS. 1 and 2, knob 42 has a maximum transverse dimension less than that of barrel 12. This feature assures that, when unit 10 is in use, the area of the hand adjacent to the knob will remain essentially out of contact with the knob. Thus, the knob will not accidentally be rotated relative to the barrel. Also, when unit is resting on a table or other supporting surface the knob will be spaced from the surface. Thus, the knob will not be rotated if the barrel is rolled over the surface.

In use, unit 10 is assembled with collet 14 received in one end of the barrel and shaft 16 received in the opposite end until spacer 44 engages the opposite end of the barrel. The shaft is threadably coupled into the collet and clamping members 32 are initially in their equilibrium positions. The unit is then ready to receive a tool in slot 30 of the collet.

For purposes of illustration only, the tool is defined by a blade 38 having a flat shank 40 which is inserted into the slot. The knob 42 is then rotated to, in turn, rotate shaft 16 in a direction to cause collet 14 to be drawn into the barrel. When this occurs, clamping members 32 move toward each other and into clamping relationship to shank 40, whereupon the tool is rigidly secured to the barrel itself. When the tool is in place, spacer 44 engages the opposite end of the barrel while surfaces 28 and 36 are in juxtaposition and in complemental engagement in the manner shown in FIG. 5.

When it is desired to separate the tool from unit 10, shaft 16 is rotated in the opposite direction, whereupon collet 14 is immediately moved outwardly of the barrel with surfaces 28 and 36 cleanly separating due to the fact that the bevel angles thereof are greater than the friction angle of materials forming the barrel and the collet. The clamping members then move apart due to the resilient nature of the collet so that the tool can easily be removed from slot 30.

Since the inner end of collet 14 is releasably coupled to the inner end of shaft 16, the collet can be replaced without removing the shaft from the barrel. While only one type of collet has been illustrated and described herein, it is clear that other collets could be used if desired. For instance, the collet, the shaft and the knob could all be tubular to permit the tool mount to define a pin vise with the pin extending completely or partially through these three components. Tools other than a blade or a pin could be releasably held by the collet so that mounting unit 10 can be used in any one of a variety of ways, especially by hobbyists and by those involved with graphic arts work.

Although the foregoing invention has been described in some detail by way of illustration and example for purposes of clarity of understanding, it is understood that certain changes and modifications may be practiced within the spirit of the invention and scope of the appended claims.

I claim:

1. A tool-mounting device comprising:
    an elongate barrel having a longitudinal channel therethrough and formed at one end with a beveled inner surface inclined outwardly at a predetermined first angle;
    an elongate tool-grasping collet movably retained within the channel of said barrel at the beveled end thereof, said collet formed with a plurality of tool-grasping means extending outwardly from said barrel, said tool-grasping means defining in combination a beveled outer surface for sliding cooperation with the beveled inner surface of said barrel and tapering outwardly at a predetermined second angle slightly greater than the predetermined first angle of taper of the beveled inner surface at the end of said barrel;
    a shaft extending into the end of the barrel opposite said collet and threadably coupled to the end of the collet inside the barrel, said shaft rotatable relative to the barrel in opposite directions for moving the collet into and out of said barrel;
    knob means on the outer end of the shaft for grasping the shaft, said knob means having a diameter greater than the diameter of the channel of said barrel for engaging the end of the barrel opposite said collet to limit movement of the shaft and provide a bracing surface for withdrawing the collet into the barrel to compress the collet tool-grasping means against a tool inserted therein, said knob means formed of a material different from the material comprising said barrel thereby to reduce friction and galling at the working interface between the barrel and said knob means; and the predetermined first angle of the outwardly inclined beveled inner surface at the end of said barrel being selected so that for the materials comprising said barrel and collet the angle is greater than the critical angle at which frictional seizing or gripping occurs between the inner surface of the barrel and the outer surface of the collet upon application of pressure to the collet by said knob means and shaft.